United States Patent
Marques et al.

(10) Patent No.: US 6,936,561 B2
(45) Date of Patent: Aug. 30, 2005

(54) MONOLITHIC ZEOLITE COATED STRUCTURES AND A METHOD OF MANUFACTURE

(75) Inventors: Paulo Marques, Fontainebleau (FR); Christophe Remy, Thomery (FR); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 116 days.

(21) Appl. No.: 10/376,094

(22) Filed: Feb. 28, 2003

(65) Prior Publication Data

US 2003/0162650 A1 Aug. 28, 2003

(30) Foreign Application Priority Data

Dec. 2, 2002 (EP) ............................................ 02292962

(51) Int. Cl.⁷ ............................................... B01J 29/06
(52) U.S. Cl. ............................... 502/64; 502/60; 502/66
(58) Field of Search ................................ 502/60, 64, 66

(56) References Cited

U.S. PATENT DOCUMENTS

| | | | |
|---|---|---|---|
| 3,928,239 A | 12/1975 | Yonehara et al. | |
| 4,367,162 A | 1/1983 | Fujitani et al. | |
| 4,429,718 A | 2/1984 | Mercier | |
| 4,460,699 A | 7/1984 | Convers et al. | |
| 4,529,718 A | 7/1985 | Dupin | |
| 4,762,567 A | 8/1988 | Retallick | |
| 4,800,187 A | 1/1989 | Lachman et al. | |
| 4,921,731 A | 5/1990 | Clark et al. | |
| 5,116,586 A | 5/1992 | Baacke et al. | |
| 5,210,062 A | 5/1993 | Narula et al. | |
| 5,272,125 A | 12/1993 | Weible et al. | |
| 5,292,696 A | 3/1994 | Ito et al. | |
| 5,292,991 A | 3/1994 | Lachman et al. | |
| 5,330,945 A | 7/1994 | Beckmeyer et al. | |
| 5,407,880 A | 4/1995 | Ikeda et al. | |
| 5,409,671 A | 4/1995 | Takemoto et al. | |
| 5,585,136 A | 12/1996 | Barrow et al. | |
| 5,618,772 A | 4/1997 | Suda et al. | |
| 5,681,788 A | 10/1997 | Kanesaka et al. | |
| 5,874,153 A | 2/1999 | Bode et al. | |
| 6,001,320 A | 12/1999 | Addiego | |
| 6,093,378 A | 7/2000 | Deeba et al. | |
| 2003/0181316 A1 * | 9/2003 | Hiramoto et al. | ............. 502/64 |

FOREIGN PATENT DOCUMENTS

| | | | |
|---|---|---|---|
| DE | 100 50 748 | | 9/2001 |
| EP | 0 847 803 | | 6/1998 |
| EP | 1068892 | | 1/2001 |
| EP | 1 121 981 | * | 8/2001 |
| JP | 5285378 | | 11/1993 |
| JP | 07124468 | | 5/1995 |
| WO | 95/23025 | | 8/1995 |
| WO | 00/43337 | | 7/2000 |
| WO | 01/16052 | | 3/2001 |

* cited by examiner

*Primary Examiner*—Christina Johnson
(74) *Attorney, Agent, or Firm*—Kees van der Sterre

(57) ABSTRACT

Structured zeolite coated structures comprising thick porous inorganic zeolite coatings disposed on monolithic support structures, which can be honeycomb shaped, are disclosed. The zeolite coatings have open interconnected pores of controlled pore size and are characterized by improved durability, physical integrity, and adherence sufficient to enable use as supports for catalysts in liquid phase applications under harsh reaction conditions. Methods for making zeolite coated structures are also disclosed.

9 Claims, No Drawings

MONOLITHIC ZEOLITE COATED STRUCTURES AND A METHOD OF MANUFACTURE

BACKGROUND OF THE INVENTION

The present invention relates to structured zeolite monoliths, and more particularly to structured zeolite catalysts of honeycomb or other open cross-flow shape wherein the catalysts are supported on the interior surfaces of the structures as layers configured to improve both the physical properties of the catalyst and the effectiveness of the catalyst for the treatment of fluid reactant streams passing through the structure.

Zeolites are alkali-silica-alumina materials having well-defined microporous structures. They are commonly used as an active component in various catalytic applications such as aromatic ring alkylations (ethyl benzene, cumene, or linear alkylbenzenes (LAB's) for detergents), hydrocracking of gas oils and distillates, lube hydrocracking, light paraffin isomerization, distillate isomerization, distillate catalytic dewaxing, lube oil catalytic dewaxing, toluene disproportionation, and xylene isomerization. They may also be used for adsorption and separation processes such as gas separation (adsorption, pressure swing adsorption), linear and branched alkane separation, and for on-board vehicle hydrocarbon traps.

Typically, the zeolites are employed in a pelleted form, usually bound within an inorganic matrix or supported on material such as gamma alumina. Incorporating the zeolite into a monolith conveys certain advantages relative to pellet forms. These include lower pressure drop, thin walls, and high catalyst utilization factors. In addition to cellular ceramic monoliths, other structured systems including foams, metal monoliths, and the external surfaces of tubes and walls can be considered. Unfortunately, zeolite formulations that have been adapted for use as monolithic catalysts or adsorbers in the prior art are either of marginal structural durability for applications such as gas-liquid feed stream processing, or so extensively consolidated as to provide only limited catalytic or adsorption activity for such applications.

Inorganic honeycombs supporting catalyst coatings are widely used for applications such as automobile engine exhaust emissions control. In general, the catalysts for these applications are manufactured by washcoating selected ceramic or metallic honeycomb structures with slurries comprising refractory, high-surface-area catalyst support oxides, and then depositing selected metallic catalysts on the surfaces of the support oxides. Thin washcoats of alumina supporting precious metal catalysts such as platinum, palladium and rhodium these applications are disclosed, for example, in U.S. Pat. Nos. 4,762,567 and 4,429,718.

A related coating technology, more commonly used to deposit thin and usually dense oxide coatings on substrates, is sol-gel processing. U.S. Pat. No. 5,210,062 discloses the use of oxide sols to deposit thin washcoats on honeycomb supports for automotive catalytic converters. Sol-gel coatings have also been used, for example, to protect underlying substrate materials, to improve wear resistance, and to impart desired dielectric properties. The starting materials for these processes are liquid sols, which may be defined as liquid suspensions of solid particles that are small enough to remain suspended indefinitely by Brownian motion. In the sol-gel process, these sols are converted to gels by appropriate chemical or thermal treatments during which solid or semi-solid networks of the solid particles are formed, with the liquid phases being uniformly interspersed throughout.

Gels produced in this way can exhibit viscous flow behavior permitting shaping into useable forms such as bulk shapes, fibers, coatings and the like. Oxide films can be prepared from the gels or their precursor sols by methods such as spin, dip, spray, bead, slot, curtain or brush coating, with subsequent heating to remove the liquids and convert the solids to thin and/or dense oxide coatings of a variety of predetermined compositions and structures.

One common sol-gel approach for producing protective oxide coatings, disclosed for example in U.S. Pat. Nos. 4,921,731 and 5,585,136 and in published PCT application No. WO 01/16052, is to dissolve organometallic precursor compounds of the desired oxides in a suitable solvent and to hydrolyze the organometallics to form the sol. This sol is subsequently converted by chemical treatment or heating to an organic-inorganic gel comprising the solvent, oxide particles, and organo-metallic polymers or clusters. Coatings of these gels can then be further heated to convert them to oxide coatings. The tendency of such sol-gel oxide coatings to crack during heating is reduced through the use of particulate oxide fillers of appropriate composition. Where increased coating density is required, a treatment using phosphate components is used.

The use of sols as oxide powder binders for thin oxide catalyst support coatings has also been proposed. U.S. Pat. Nos. 3,928,239, and 6,232,253, for example, employs a permanent binder of an inorganic acid alumina sol in an alumina washcoat for an automotive or stationary exhaust catalysts. Further, published PCT application No. WO 95/23025, discloses sol-based oxide under-layers for bonding conventional metal-oxide catalyst coatings to metallic catalyst supports, and U.S. Pat. No. 5,874,153 discloses metal foil honeycombs for exhaust gas treatment provided with zeolite adsorbent coatings held in place by aluminum oxide underlayers.

An important goal of much of the washcoating technology developed for the support of precious metal automobile and other exhaust emissions control catalysts has been the protection of the oxidation activity of the largely surface-concentrated catalyst deposits at high operating temperatures and high gas flow rates. Coating thicknesses are minimized to reduce system back-pressures and to minimize the possibility of coating loss through cracking and/or flaking; thicker coatings confer no advantage and are avoided for these reasons. Thus adherent washcoats of relatively high surface area and refractoriness, but relatively low thickness and porosity, have been used. Unfortunately, such catalysts and washcoats are not very effective for promoting other types of reactions, including many reactions requiring increased-catalyst loading density, longer reactant diffusion paths, or involving mixed gas/liquid reaction streams.

SUMMARY OF THE INVENTION

The present invention provides a structured zeolite catalyst product from zeolite powder, and a method of making the product by coating a structured packing, via a sol-gel method, to form a relatively thick, highly cohesive zeolite coating adhering strongly to the structured packing. Despite their relative thickness, the cohesiveness and adherence of these coatings render them highly resistant to delamination, e.g., under the mechanical stresses arising from fluids flowing through the structured packing at high space velocities.

The invention further provides a structured zeolite catalyst incorporating a structured support consisting of a cordierite monolith, such as a cordierite honeycomb. The structured zeolite catalyst and method of making it in accordance with the invention offer very high coating thicknesses while still insuring sufficient cohesion and mechanical strength to avoid the cracking and/or delamination usually found in conventional thick washcoats. In addition, these coatings have high thermal shock resistance and good corrosion resistance, properties that are of particular interest for chemical catalysis applications.

The coating methods of the invention permit the successful application of coatings of a wide variety of different zeolite types, e.g., Y-type, Beta, ZSM5, and others, and they enable lower firing temperatures (e.g., 400° C. or below) to be used for final cure of the coatings. Thus catalyst-impregnated zeolites can be directly deposited on structured packings to yield products having the catalyst homogeneously distributed throughout the zeolite coating.

The coating methods of the invention advantageously enable the effective coating of structured element surfaces other than those of porous ceramic composition, including but not being limited to metal substrates such as metal distillation packing. And, the substantial thicknesses and controlled porosities of these structured zeolite washcoats impart substantially improved catalytic effectiveness to structured elements regardless of the nature of the support structure used.

An important characteristic of zeolite structured washcoats provided according to the invention, in addition to their controlled thickness and pore morphology, is a high degree of coating continuity. Thus, despite their thickness, these coatings exhibit substantial freedom from structural cracking, i.e., through-cracks capable of degrading the overall mechanical integrity of the coatings. It is largely for this reason that these coatings exhibit high resistance to erosion even under reactor conditions involving rapid or turbulent flow conditions, whether of single phase (gas or liquid) or two-phase (gas and liquid) composition. The high coating integrity additionally enables the use of structured metal and ceramic supports for the zeolite washcoats and catalysts that would otherwise be unsuitable for reasons such as inadequate porosity or surface area, chemical incompatibility with the catalyst or reactant stream, and/or poor chemical or physical durability.

Another advantage of these washcoating systems is that the washcoats may themselves be formed of combinations of support materials that are not economically capable of direct shaping into honeycomb structured catalyst configurations, or that offer combinations of chemical and physical properties not attainable in conventional metal or ceramic systems.

In a first embodiment, therefore, the invention includes a structured catalyst comprising a thick porous zeolite catalyst or catalyst support washcoating layer disposed on inorganic monolithic support structure. For the purpose of the present description monolithic support structures, and the structured catalysts made therefrom, are characterized as integral structures comprising internal void spaces (channels, cavities or the like) bounded by internal surfaces and within which a reactant stream entering the structured catalyst for treatment comes into contact with zeolite and/or other catalytically active species in the zeolite washcoat layer disposed on the internal surfaces. The zeolite washcoat or catalyst support layer will have both a predetermined porosity and a minimum layer thickness. The monolithic support structure is preferably cordierite, but can also be composed of metallic or ceramic composition, the latter being inclusive of carbide, nitride, boride and other non-traditional ceramic formulations as well as other conventional oxide ceramic materials.

In the case of a honeycomb support structure, the zeolite layer will be disposed on the channel walls as a thick porous inorganic catalyst or catalyst support layer. That layer will typically (i) provide an open and interconnected porosity of at least 5%, more preferably at least 30%, and
(ii) be characterized by a mean pore size in the range from 0.2–$10^4$ nanometers; and
(iii) be substantially free of structural cracking that can initiate coating release while in contact with flowing liquids.

Disposed on or within the pore structure of this layer may be a metal, metal oxide, metal sulfide, or other catalytically active species having activity and selectivity for the particular reaction for which the structured catalyst is to be used.

In a second embodiment, the invention includes a method for making a structured catalyst of monolithic configuration as above described in which a suitable support structure is an inorganic honeycomb structure comprising a plurality of parallel through-channels through which the reactant stream may flow. To at least the interior channel walls or surfaces of the support structure thus provided is applied a washcoating slurry comprising a powdered zeolite catalyst or catalyst support material.

The slurry includes a liquid phase that constitutes or contains a precursor for a permanent inorganic binder for the oxide catalyst support material. The inorganic binder, typically a metal oxide binder, is selected for its effectiveness in forming a thick washcoating layer of the required internal pore structure. The binder is typically not a zeolitic material, thus differing somewhat in composition from the composition of the zeolite catalyst or catalyst support material, and its precursor will generally be an organometallic or inorganic compound of the metal that is soluble or highly dispersible in the liquid phase of the slurry.

Following application of the wash-coating slurry to the interior channel walls of the support structure to form a slurry coating layer, the structure and its included coating layer are next heated to a temperature at least sufficient to remove the liquid phase from the slurry to form the deposited zeolite layer. Depending on the thickness of the zeolite washcoating required, the process of slurry application and liquid-removal may be repeated several times. Zeolite layer thicknesses of at least 100 μm, more typically 150–300 μm or more, are normally employed for certain classes of liquid and gas-liquid reactions. Where multiple layers are needed to achieve such thicknesses, heating to remove liquid phases from each underlying layer prior to the deposition of succeeding layers is normally preferred. Final heating to temperatures sufficient to fully cure or partially sinter the assembled layers into a unitary (i.e., substantially free of structural cracking), adherent, porous zeolite-based coating can be carried out after each layer deposition, but is generally instead deferred until after all of the layers have been deposited.

The step of providing catalytically active species on or within at least one, but more typically all, of the deposited layers can be carried out either during layer deposition, or after all of the layers have been deposited, and either before or after layer curing has been carried out. Further, the composition of the catalyst, and/or of the zeolite itself, can be selected in order to vary the properties of the layers. This flexibility allows for the development of structured catalyst layers not easily obtainable by conventional washcoating methods.

Thus the invention further includes a method of making a structured catalyst that achieves close control over the composition or concentration of the catalyst within the structure of the washcoating by controlling the distribution and composition of the catalysts or zeolites. For example, the catalytic species in at least some of the layers can differ in composition and/or in concentration from that provided in adjacent layers, or some of the layers may differ from adjacent layers as to thickness, porosity, or both. Alternatively, the precise control over the concentration of a single catalytically active species in each layer permits a higher degree of catalyst concentration uniformity across the entire layered structure than is achievable by impregnation of a single coating layer.

The steps that can optionally be followed to vary the composition, pore morphology, or other properties of the zeolite catalyst support layer for the purpose of adapting the zeolite structured catalyst to specific applications are numerous and varied. For example, catalysts or other additives can be included in the slurry composition, or instead deposited on the powdered catalyst support material, i.e., zeolite, added to the slurry. That is, the zeolite powders themselves can be first impregnated with a catalyst, and then the catalyzed zeolites deposited in the washcoat.

As suggested above, the washcoat slurries of the invention can include other constituents such as pore-forming additives to modify the pore structure of the layers through subsequent thermal or chemical treatment thereof. Gel-promoting additives can be included to promote gelling of the deposited layers prior to drying, such gelling being useful to increase the thickness of the deposited layer, to modify the final coating microstructure, and/or to control the geometrical shape of the deposited layers.

In yet a third embodiment of the invention, an improvement in the process for catalytically treating a liquid or gas-liquid feedstream with a structured catalyst is provided. Structured catalysts of the kind conventionally used for gas phase reactions, i.e., those comprising inorganic catalyst support structures wherein the catalysts are disposed on relatively thin oxide catalyst support coatings, can be replaced with the zeolite-structured catalyst supports of this invention.

In accordance with this embodiment the zeolite catalyst or catalyst support coating employed is a thick, porous, strongly adherent oxide washcoat substantially free of structural defects such as through-cracks and thus having sufficient physical durability to withstand prolonged contact with flowing liquids, yet providing a high volume of open, interconnected porosity. That porosity is generally characterized by a mean pore size in the range of about 0.2 to $10^4$ nanometers and a porosity of at least 5% by volume, preferably at least 30% by volume, of the washcoat.

DETAILED DESCRIPTION

An important aspect of the invention is the finding that conventionally applied zeolite washcoating layers will not perform adequately in many chemical reactions involving the treatment of liquid-containing feed streams at reasonable liquid flow rates. This can be because the flowing liquids tend to separate the coatings from the supports, or because for reactions with a weak limitation by mass transfer a thin layer of catalyst results in unacceptable process yields, or both.

Providing effective support coverage with strongly adhering yet porous zeolite coatings in accordance with the invention can significantly improve process yields for some chemical reactions. Advantageously, the methods of the invention enable the deposition of porous yet highly durable coating layers of thicknesses well above conventional thickness ranges, e.g., averaging above 300 micrometers, or even above 500 micrometers or 750 micrometers in thickness. Thicknesses in these ranges may in fact be required for some two- and three-phase reactions involving the treatment of flowing liquid or gas-liquid feedstreams in order that commercially acceptable reaction rates can be realized.

As noted above, an important advantage of the use of thick zeolite washcoats in accordance with the invention is the ability to tailor the texture of the washcoat to develop a specific pore morphology for each intended application. The porosity, and particularly the macroporosity, of the washcoat can be adjusted either by process modifications or through the use of supplemental pore formers. For highly densified coatings pore sizes in the range of zeolites themselves (e.g. 0.2 nanometers) are achievable, whereas through the use of supplemental pore formers very large pore sizes (e.g., up to one micrometer, or even up to 10 micrometers) are possible. Of course the use of highly porous washcoats has the recognized tendency to decrease washcoat density and catalyst loading density per unit of reactor volume so that, in general, compromises providing the optimal pore morphology for each particular structured catalyst application and reactor design are necessary.

Fine-tuning zeolite washcoat texture extends not only to the development of higher or lower washcoat densities, but also to the creation of different textures across the thickness of the deposited zeolite, e.g. through use of washcoat layering. Multiple functionalities can be provided by incorporating two or more regions of differing density, pore morphology, or catalyst concentration or composition within selected portions the washcoating layer. Many of the techniques for the production of washcoating layers permit good control over layer thickness and coating texture. Thus different textures at each point across the thickness of the coating and/or multimodal pore size distributions at selected points where required for a particular chemical processing application, are readily enabled.

Control over washcoat surface texture is of particular interest for applications such as counter-current catalytic reactions wherein liquid and gas flow rates and reactor operating ranges are limited by flooding phenomena. Although flooding can be triggered by various mechanisms, as well documented in the literature, the use of washcoats with optimized texture to impact certain of these mechanisms can be effective to retard flooding so that higher liquid and/or gas flow rates and broader reactor operating ranges can be achieved. For example, honeycomb monoliths provided with highly porous washcoats may favor more stable liquid films on the channel walls of the honeycombs, retarding the formation of liquid bridges that can induce flooding in such channels.

Washcoat porosity and morphology can also be useful to control the selection and concentration of chemical species adsorbed on the walls of structured catalysts, e.g., the thickness of the liquid film formed on the channel walls of a washcoated honeycomb. High washcoat porosity can reduce the incidence of dry spots on such channel walls as porous surfaces are more easily wetted by flowing liquids.

Mass transfer control in catalytic reactors is another area where the adjustment of washcoat pore morphology can be helpful. For example, the use of more porous washcoats can increase chemical reaction efficiency in cases where catalyst accessibility is a controlling factor in a rate limiting reaction step. Further, where the channel walls of a structured catalyst themselves feature open porosity, permitting some liquid flow between channels, the use of highly porous washcoats can aid inter-channel liquid flow that can help to equalize liquid loading among the various channels through the catalyst.

Washcoats with different textures across their thicknesses can be effective to limit the diffusion of particular reactants to particular catalysts disposed in specific locations within the washcoat layer. Such limits can be of substantial advantage for purposes such as improving the selectivity of the structured catalyst for certain reactions. Thus, for example, undesired reactions with larger molecules in a multi-component reactant feed can be retarded using reduced washcoat pore sizes to limit molecular access to underlying catalyst layers. An analogy is found in the present commercial use of bimodal catalysts for the removal of V and Ni through the hydro-demetallization of heavy oil feedstocks. However, conventional catalyst deposition methods favoring the homogeneous distribution of catalyst metals or oxides on or within homogenous supports or washcoats, including impregnation, adsorption, precipitation and direct extrusion methods, do not lend themselves to the production of these graded catalysts.

The process variations useful for the production of thick zeolite washcoats on structured catalysts in accordance with the invention are those effective to produce adherent coatings with adequately interconnected porosity at high coating porosities. In general, the more successful procedures will involve the use of binder formulations wherein the permanent binder component, e.g., alumina, of the formulation is dissolved in a liquid carrier. Such components can include inorganic oxide sols as well as dispersions of solid oxides of very fine particle size.

Structured zeolite catalysts provided in accordance with the invention offer significant economic and performance advantages when used in commercial reactors employed for the processing of liquid and gas-liquid process streams. A particularly important advantage is that essentially any durable structure can be used to support the thick washcoats and catalysts, since the impacts of support structure chemistry and microstructure are essentially eliminated. Thus no special compositional or microstructural properties are required of the structure supporting the washcoat and catalyst.

The porous washcoats themselves can be provided in a wide range of thicknesses and porosities, e.g., from 100 micrometers to 3 or more millimeters in thickness, with average pore sizes ranging up to 10 micrometers and porosity from at least 5%, or more preferentially from at least 30%, up to 65% or even higher. Yet the coatings are sufficiently adherent and durable, particularly when oxide gel binder phases are employed, that they can offer dependable service in gas-liquid environments with small risk of washcoat damage or loss of catalyst even at relatively high gas and/or liquid velocities.

Hydrotreating reactions such as hydrogenation, hydrodemetallization, and hydrodesulfurization, carried out with gas-liquid feed streams wherein hydrogen is present in the gas phase, are examples of reactions wherein thick porous zeolite washcoats of the kind herein described are particularly useful.

The composition of the particular catalytically active species incorporated within the porous zeolite washcoats is not critical, but may be determined in accordance with conventional practice, i.e., in view of the particular application or process environment within which the structured catalyst is to be utilized. Conventional catalysts that can be advantageously employed in accordance with the invention include at-least the precious metal catalysts of Group VIIIA of the Periodic Table of Elements, as well as the transition metals of Groups IVA, VA, VIA, VIIA and VIIIA thereof.

Likewise the invention can be used to provide thick zeolite coatings incorporating any of a wide variety of zeolites, or suitable combinations there. Examples of specific zeolites that may be found useful are Y, X, ZSM-5, ZSM-11, ZSM-35, ferrierite, Beta, SAPO, AlPOs, MCM-41, MCM-22 zeolites.

The invention may be further understood by reference to the following detailed examples of zeolite washcoats provided in accordance therewith, which, however, are intended to be illustrative rather than limiting.

EXAMPLE 1

Structured Catalyst Support with Sol-bound Zeolite Washcoat

A thick durable zeolite washcoat of high porosity is provided on the interior channel walls of a ceramic honeycomb monolith catalyst support of cordierite composition.

The ceramic honeycomb selected for washcoating is a square-celled cordierite honeycomb having a cross-sectional cell density of about 7 cells/cm$^2$ and a channel wall thickness of about 0.6 mm.

To provide a zeolite washcoating on the interior channel walls of the honeycomb, an alumina sol is first provided. The sol preparation procedure described in U.S. Pat. No. 5,585,136 is used for that purpose. A quantity of aluminum isopropoxide (99% wt.) is first hydrolyzed by mixing with hot water, and the resulting mixture is then peptized by the addition of nitric acid to achieve a pH of 4. The peptization step produces an alumina sol solution containing about 1 mole of alumina per liter of sol.

To the resulting sol is added a powder mixture consisting of 40 parts by weight of high-surface are gamma alumina and 60 parts by weight of H-Y zeolite, that zeolite being commercially available as CBV710 zeolite from Zeolyst International, Inc., of Valley Forge, Penna. The powder mixture is mixed into the sol in at a level of about 0.35 parts of powder for each 1 part of alumina sol, these proportions being effective to form a flowable slurry of a viscosity suitable for application to the selected honeycomb by dipping. This slurry may conveniently be thinned with water if, for example, a thinner zeolite coating is desired.

To deposit the zeolite washcoat, the cordierite honeycomb is dipped in the alumina slurry, allowed to drain, and the residual coating layer then dried and cured by heating the honeycomb and coating to a temperature of 600° C. This heating cures and strongly binds the coating layer to the honeycomb channel walls.

The above dipping, draining, drying and curing steps are repeated to deposit four additional washcoating layers onto the walls of the cordierite honeycomb channels, the five coating layers then yielding a final zeolite washcoat thickness of approximately 400 μm thickness on the interior channel walls of the honeycomb. The coating is well-adhered and substantially free of through-cracking that might cause coating chipping or spalling under prolonged exposure to flowing liquid, gas-liquid, and even gas-liquid-solid feed streams without chipping or spalling.

EXAMPLE 2

Pt Catalyst on Thick Zeolite Washcoat

A catalyst support consisting of a zeolite-washcoated cordierite honeycomb produced in general accordance with the procedure described in Example 1 above is impregnated with a platinum catalyst. An aqueous platinum solution is prepared by adding chloroplatinic acid $H_2PtCl_6$ to water (80 ml) to achieve a platinum metal concentration of 0.4% by weight.

The catalyst support is catalyzed by immersion into the thus-prepared catalyst solution, followed by drying and heating of the impregnated honeycomb in air to 400° C. to vaporize the water and convert the platinum compound to platinum. The catalyzed support is then cooled and subjected to an electron microprobe examination to determine the distribution of the catalyst throughout the coating. The immersion treatment is found effective to achieve complete platinum impregnation of the porous zeolite washcoat throughout its thickness.

EXAMPLE 3

Thick Molecular Sieve Washcoat

The procedure of Example 1 is followed except that a powder mixture consisting of 30 parts by weight of high-surface-area gamma alumina powder (surface area of about 200 m$^2$/g) and 70 parts by weight of commercially available CBV-760 H-Y zeolite is used to prepare the washcoating slurry as therein described. Using this slurry, well-bonded, substantially crack-free washcoats of 400 μm thickness are provided on the cordierite honeycomb support with only four 4 dipping and heating steps to cure the zeolite layers.

EXAMPLE 4

Structured Metal Catalyst Support with Thick Sol-Bound Washcoat

A structured catalyst comprising a thick zeolite washcoating is prepared using as the catalyst support a metal packing structure of the kind utilized to enhance mass transfer in large chemical distillation and absorption columns. The metal packing structure employed is one of the commercially available Rombopak® family of structured packing elements sold by Kühni AG, Winterthur, Germany.

A zeolite washcoating slurry suitable for coating the metal support is prepared in accordance with the procedure described in Example 1, and the metal support structure is washcoated by repeated dipping, drying and heat-curing of slurry coating layers as therein described. The product of seven dipping and curing steps in accordance with that procedure is a structured catalyst consisting of the metal catalyst support supporting a zeolite washcoat of about 0.6 mm thickness.

Developing washcoats of very large pore size and/or high porosity can be critical for certain types of catalytic applications, particularly where three-phase processing involving the treatment of gas-liquid feed streams with solid supported catalysts is required. Advantageously, pore size and/or porosity (pore volume) enhancements can readily be provided in accordance with the invention through the use of pore-forming additives to the above-described washcoating formulations. The nature of the pore-forming additive is not critical; the selected additive may comprise any one of a number of chemical agents of known utility for the enhancement of porosity in fired ceramic materials, or a combination thereof.

Among the pore-forming additives suitable for developing porosity in thick zeolite-based washcoats applied by sol-gel methods in accordance with the invention are carbonaceous particulate materials that are oxidizable in air without significant residue at temperatures not exceeding 500° C. Specific examples of such materials are graphite and cornstarch. These can be introduced into the washcoating slurry just prior to application, with thorough mixing to insure adequate dispersion, and they remain in the dried coating until the coating temperature rises to the oxidation point of the additive in the course of curing the washcoat.

Where porosity enhancement of the thick washcoats or selected washcoat layers are desired, additions of carbon-containing particulates in proportions ranging from about 5% to as much as 50–60% by volume of the dry or powder fraction of the washcoating slurry are suitable. These highly porous washcoats are of particular interest in cases where the structured catalytic support is itself formed of porous materials, since in those cases even substantial washcoat thicknesses are less inhibiting of channel cross-flow than is the case for non-porous washcoating layers.

The foregoing examples of specific compositions, processes, articles and/or apparatus employed in the practice of the present invention are of course intended to be illustrative rather than limiting, and it will be apparent that numerous variations and Modifications these specific embodiments may be practiced within the scope of the appended claims.

We claim:

1. A zeolite coated monolithic article comprising:

an uncoated monolithic support structure including walls having open porosity; and a porous inorganic zeolite coating disposed directly upon the uncoated monolithic support structure, wherein the zeolite coating has a permanent alumina binder component, an open, interconnected porosity characterized by a mean pore size in the range of about 0.2 to $10^4$ nanometers, a porosity of 30% to 65%, and a thickness in excess of 100 $\mu$m.

2. The zeolite coated monolithic article of claim 1, further including a metal, metal oxide, or metal sulfide catalytically active species disposed on or within the zeolite coating.

3. The zeolite coated monolithic article of claim 1 incorporating at least two zeolite coating layers differing in density, pore morphology, or catalytic species composition from one another.

4. A method of making a zeolite coated monolithic article comprising the steps of:

(a) providing a monolithic support structure;

(b) providing a wash-coating slurry comprising a pore-forming additive and a zeolite powder dispersed in a sol-gel binder slurry phase which contains an alumina inorganic binder precursor;

(c) depositing the slurry directly upon on surfaces of the monolithic support structure to form a first slurry coating layer;

(d) heating the first slurry coating layer to a temperature at least sufficient to remove the liquid phase therefrom to provide a first deposited layer;

(e) repeating steps (a)–(d) above to form additional deposited layers to form a porous multi-layered zeolite coating incorporating an alumina binder.

5. The method according to claim 4, wherein the monolithic cordierite support structure is a ceramic honeycomb support structure.

6. The method according to claim 4, wherein the multi-layered zeolite coating has a thickness of at least 100 $\mu$m.

7. The method according to claim 4 which further comprises the step of providing one or more catalytically active species selected from the group consisting of precious metal catalysts and transition metal catalysts on or within at least one deposited zeolite layer.

8. The method according to claim 4 wherein the washcoating slurry further comprises at least one of a gel-promoting constituent and a pore-forming additive.

9. A zeolite coated monolithic ceramic article comprising:

a monolithic ceramic support structure including walls having open porosity; and a porous inorganic zeolite coating disposed directly upon the ceramic support structure, wherein the zeolite coating has an open, interconnected porosity characterized by a mean pore size in the range of about 0.2 to $10^4$ nanometers and a porosity of 30% to 65%, and is formed by the method comprising the steps of:

(a) providing a monolithic ceramic support structure;

(b) providing a wash-coating slurry comprising a zeolite powder dispersed in slurry phase which contains an inorganic binder sol precursor;

(c) depositing the slurry on surfaces of the monolithic support structure to form a first slurry coating layer;

(d) heating the first slurry coating layer to a temperature at least sufficient to remove the liquid phase therefrom to provide a first deposited layer;

(e) repeating steps (a)–(d) above to form additional deposited layers to form a multi-layered coating.

* * * * *